United States Patent [19]

Inoue et al.

[11] Patent Number: 5,219,959
[45] Date of Patent: Jun. 15, 1993

[54] PRODUCTION OF POLY(PHENYLENE SULFIDE) OF AN IMPROVED REACTIVITY

[75] Inventors: Hiroshi Inoue; Toshikazu Kato; Masaaki Ohtsuru, all of Mie, Japan

[73] Assignees: Tosoh Corporation, Yamaguchi; Toso Susteel Co., Ltd., Tokyo, both of Japan

[21] Appl. No.: 815,858

[22] Filed: Jan. 2, 1992

Related U.S. Application Data

[63] Continuation of Ser. No. 439,308, Nov. 21, 1989, abandoned.

[30] Foreign Application Priority Data

Nov. 21, 1988 [JP] Japan .................. 63-292346

[51] Int. Cl.$^5$ .................. C08F 6/00; C08F 283/00
[52] U.S. Cl. .................. 525/537; 528/388
[58] Field of Search .................. 525/537; 528/388

[56] References Cited

U.S. PATENT DOCUMENTS

| | | | |
|---|---|---|---|
| 3,966,688 | 6/1976 | Campbell | 525/537 |
| 4,405,767 | 9/1983 | Beever et al. | 525/537 |
| 4,785,057 | 11/1988 | Shiiki et al. | 525/537 |
| 5,015,702 | 5/1991 | Scoggins et al. | 525/537 |
| 5,037,952 | 8/1991 | Schmidt et al. | 528/388 |

FOREIGN PATENT DOCUMENTS 0275991 7/1988 European Pat. Off. .
1386042 12/1964 France .

OTHER PUBLICATIONS

Chemical Abstracts, vol. 105, No. 26, abstract 227349f.
Die Macromolekulare Chemie: Macromolecular Symposia, vol. 26, Mar. 1989, pp. 333,346.
Derwent Publications, Jan. 1986, accession no. 86-012195.
Chemical Abstracts, vol. 89, No. 26, abstract no. 216052d.

Primary Examiner—John C. Bleutge
Assistant Examiner—Helen F. Lee
Attorney, Agent, or Firm—Sughrue, Mion, Zinn, Macpeak & Seas

[57] ABSTRACT

A poly(phenylene sulfide) material containing predominantly para-phenylene sulfide structural units and having a melt viscosity of at least 5 poises (at 300° C.) may be treated or reacted with an alkali metal sulfide and/or hydrosulfide in a polar aprotic solvent at a relatively low temperature in the range of 150°-230° C. so as to introduce an increased amount of reactive thiolate or thiol end groups to the polymer molecule and hence to enhance the reactivity of the polymer material. The thus modified and highly reactive poly(phenylene sulfide) material exhibits an improved compatibility with other polymers and is expected to be useful in preparation of polymer alloys of improved or modified physical and chemical properties.

9 Claims, No Drawings

PRODUCTION OF POLY(PHENYLENE SULFIDE) OF AN IMPROVED REACTIVITY

This is a continuation of application No. 07/439,308 filed Nov. 21, 1989, now abandoned.

This invention relates to a method for preparing a poly(phenylene sulfide) material rich in thiolate or thiol end groups and improved in the reactivity by virtue of the presence of such the end groups.

Generally, poly(phenylene sulfide) materials exhibits excellent heat and chemical resistance properties and, hence, have attracted a good deal of attention as material for producing articles such as parts in electrical and electronic instruments and automotive parts. The polymer materials can be injection-molded, extrusion-molded or otherwise molded into various shaped articles including films, sheets and fibers, and the resulting articles find extensive use in applications where resistance to heat and chemicals is required.

One conventional method for producing poly(phenylene sulfide) comprises reacting a dihalo aromatic compound with an alkali metal sulfide such as sodium sulfide in a polar aprotic solvent such as N-methyl-2-pyrrolidone (see, for example, Japanese Patent Publication No. 45-3368). However, the polymer produced by such a method has a reactive thiolate or thiol group at one end each of the molecules and a stable or poorly reactive halide group at the other end. The concentration of the reactive thiolate or thiol groups is so low that the polymer shows an unsatisfactorily poor extent of reactivity. Hence the polymer exhibits a poor compatibility when blended with other polymers and, thus, can provide only polymer alloys of poor physical properties.

Accordingly, the present invention provides a method for preparing a poly(phenylene sulfide) improved in the reactivity by introduction of additional thiolate or thiol end groups to the molecule.

Thus the present invention concerns a method for preparing a poly(phenylene sulfide) improved in the reactivity which comprises reacting a poly(phenylene sulfide) predominantly containing structural units:

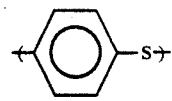

and having a melt viscosity of at least 5 poises as measured at 300° C. with an alkali metal sulfide and/or hydrosulfide in a polar aprotic solvent at a temperature in the range of from 150° C. to 230° C. so as to introduce an increased amount of thiolate or thiol end groups to the poly(phenylene sulfide) material.

The present invention will be described in detail.

The poly(phenylene sulfide) materials which may be used in the present invention are not limited to any particular ones and include poly(phenylene sulfide) polymers produced by the conventional methods, for example, the method as disclosed in the aforementioned Japanese Patent Publication No. 45-3368; oxidatively crosslinked poly(phenylene sulfide) prepared by heat treating the conventionally produced poly(phenylene sulfide) in the presence of oxygen; and poly(phenylene sulfide) of an increased polymerization degree that may be prepared by the known method as described in Japanese Patent Publication No. 52-12240; provided that the materials predominantly contain structural units:

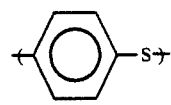

and having a melt viscosity of at least 5 poises as measured at 300° C. Herein "to predominantly contain" means that the polymer contains at least 70 mole %, preferably at least 90 mole %, of

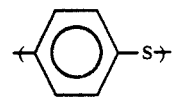

structural units in the molecule. Other structural units which may be present are ones which are copolymerizable with the above predominant units

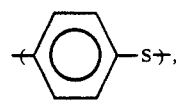

and include, for example,

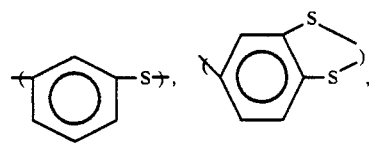

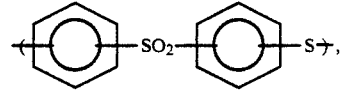

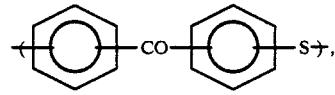

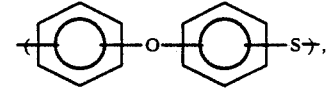

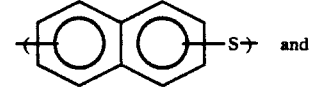 and

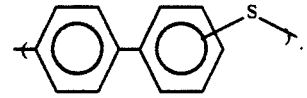

If a poly(phenylene sulfide) material has a melt viscosity of less than 5 poises, the characteristic properties, such as high thermal resistance and high crystallinity, that are possessed by the ordinary poly(phenylene sulfide) materials are not satisfactorily developed in the material of such a low melt viscosity. Therefore, the poly(phenylene sulfide) material used in the present invention has preferably a melt viscosity of at least 5 poises.

Examples of the alkali metal sulfides which may be used in the invention include sulfides of lithium, sodium, potassium, rubidium and cesium and mixtures thereof, which may be used in the hydrate form. The alkali metal sulfide may be prepared by reacting an alkali metal hydrosulfide with an alkali metal base or reacting hydrogen sulfide with an alkali metal base. In the present process, the alkali metal sulfide may be formed in situ, or may be prepared outside the reaction system and then introduced to the system. Of the above-listed alkali metal sulfides, sodium sulfide is preferably used in the process.

Examples of the alkali metal hydrosulfides which may be used in the invention include hydrosulfides of lithium, sodium, potassium, rubidium and cesium and mixtures thereof, which may be used in the hydrate form. The alkali metal hydrosulfide may be prepared by reacting an alkali metal base with hydrogen sulfide. In the present process, the alkali metal hydrosulfide may be formed in situ, or may be prepared outside the reaction system and then introduced to the system. Of the above-listed hydrosulfides, sodium hydrosulfide is preferred.

Any combination of the sulfide and hydrosulfide compounds may be used in the invention.

Suitably the alkali metal sulfide and/or hydrosulfide is employed in a concentration of 0.05-10 mole % per a structural unit of the poly(phenylene sulfide) material.

The reaction medium solvent used in the process is an organic polar solvent, preferably an aprotic solvent which is stable against alkali at high temperatures. Examples of the solvents which may be mentioned include N,N-dimethyl acetamide, N,N-dimethyl formamide, hexamethylphosphoramide, N-methyl-$\epsilon$-caprolactam, N-ethyl-2-pyrrolidone, N-methyl-2-pyrrolidone, 1,3-dimethylimidazolidinone, dimethyl sulfoxide, sulfolane, tetramethyl urea and mixtures thereof.

Where a poly(phenylene sulfide) is prepared from an alkali metal sulfide and a dihalobenzene, generally it is difficult to introduce thiolate or thiol groups at the both ends of the respective polymeric molecules, even if the alkali metal sulfide is employed in an excess proportion with respect to the dihalobenzene.

The content of the thiolate or thiol end groups in the conventionally prepared poly(phenylene sulfide) products is around 20 $\mu$ moles/g or less as mentioned in Japanese Patent Public Disclosure (Kokai) No. 62-187731. Such a level of the thiolate or thiol end group content is insufficient to render the polymer satisfactorily reactive.

In order to prepare a poly(phenylene sulfide) material rich in the thiolate or thiol end groups, the alkali metal sulfide or hydrosulfide may be suitably added either to the polymerization process at the later stage approaching the completion thereof or the polymer product recovered and isolated from the polymerization process.

Herein "the later stage of the polymerization process" means that at least about 90%, and preferably at least 95%, of the dihalobenzene has been converted.

An important factor for effectively introducing additional thiolate or thiol end groups to the poly(phenylene sulfide) material is the temperature at which the polymer material is reacted or treated with the alkali metal sulfide and/or hydrosulfide. Preferably, the reaction temperature is in the range of 150°-230° C. If the reaction or treatment is effected at temperatures in excess of 230° C., the polymer tends disadvantageously to degrade or even decompose. On the other hand, if a reaction temperature of less than 130° C. is employed, the introduction of additional thiolate or thiol end groups will proceed only at a practically unacceptable low rate. Though the reaction time is largely governed by the reaction temperature employed, usually the reaction is effected for a period of about 0.5-30 hours, and preferably about 1-15 hours, with stirring.

Recovery of the thus treated polymer material from the reaction mixture may be effected by any conventional techniques. For example, the solvent may be recovered by distillation or flashing-off and the residual polymer may be washed with water to give the desired product. Alternatively, the reaction mixture may be filtered to separate and recover the solvent from the crude polymer which is then washed with water.

The poly(phenylene sulfide) polymer produced according to the present invention is highly reactive. It is thought that when the reactive poly(phenylene sulfide) is melt-blended with any other polymer, it will form a blockgraft polymer or the like which may act as a compatibilizer. Consequently it is expected that the compatibility of the blends is advantageously improved and thus various polymer alloys having improved chemical and physical properties may provide by using the reactive polymer products of the present invention.

Examples of the polymers which may be blended with the present poly(phenylene sulfide) products include homopolymers, random copolymers, block copolymers and graft copolymers, either on their own or as admixtures, in particular, polyethylene; polybutadiene; polyisoprene; polychloroprene; polystyrene; polybutene; poly-$\alpha$-methylstyrene; polyvinyl acetate; polyvinyl chloride; polyacrylate esters; polymethacrylate esters; polyacrylonitrile; polyamides such as nylon 6, nylon 66, nylon 610, nylon 12, nylon 11 and nylon 46; polyesters such as polyethylene terephthalate, polybutylene terephthalate and polyarylate; polyurethane; polyacetal; polycarbonate; polyphenylene oxide; polysulfone; polyether sulfone; polyaryl sulfone; polyphenylene sulfide sulfone; polyether ketone; polyether ether ketone; polyphenylene sulfide ketone; polyimide; polyamideimide; silicone resins; phenoxy resins; and fluorine resins.

If necessary, various additives may be incorporated in the polymer or blends thereof and illustrative additives include: ceramic fibers such as glass fibers, carbon fibers and alumina fibers; reinforcing fillers such as aramid fibers, totally aromatic polyester fibers, metal fibers and potassium titanate whiskers; inorganic fillers such as calcium carbonate, mica, talc, silica, barium sulfate, calcium sulfate, kaolin, clay, pyroferrite, bentonite, sericite, zeolite, nepheline syenite, attapulgite, wollastonite, ferrite, calcium silicate, magnesium carbonate, dolomite, antimony trioxide, zinc oxide, titanium oxide, magnesium oxide, iron oxide, molybdenum disulfide, graphite, gypsum, glass beads, glass power, glass baloons, quartz and silica glass; and organic or inorganic pigments.

Other additives that may be incorporated as required include plasticizer such as aromatic hydroxy derivatives, mold release agent, silane or titanate based coupling agents, lubricants, heat stabilizers, weather-proofing agents, nucleating agents, foaming agents, corrosion inhibitors, ion trapping agents, flame retardants and flame retarding aids.

The reactive poly(phenylene sulfide) of the present invention may be injection-molded or extrusion-molded into various shaped articles such as films, sheets, pipes, fibers, filaments etc., either alone or in combination with the aforementioned other polymers, reinforcing agents, filler material, etc.

EXAMPLE

The present invention will be further illustrated in detail with reference to the following non-limiting Examples and Comparative Examples.

In the Examples and Comparative Examples, the melt viscosities of the samples of poly(phenylene sulfide) products were measured in a KOHKA-type flow tester (with a die having a diameter of 0.5 mm and a length of 2 mm) at 300° C. under a load of 10 kg.

Analysis of the thiolate or thiol end groups in the poly(phenylene sulfide) products was carried out in accordance with the technique which was described in Japanese Patent Public Disclosure (Kokai) No. 62-187731. The analytical technique is outlined below:

(a) Principle (i) acidification

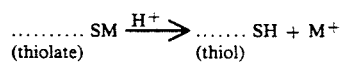

(ii) iodoacetamide treatment

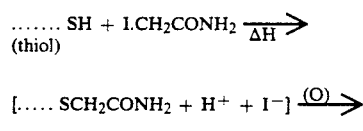

(b) Procedure

Immediately after the polymerization, part of the reaction mixture is withdrawn as a sample, which is poured into water so as to precipitate the polymer product. The polymer is recovered by filtration, rinsed with pure water, and then treated with an aqueous dilute hydrochloric acid to convert the thiolate end groups to thiol groups, rinsed with pure water for 30 minutes and finally rinsed with acetone for a further 30 minutes. The rinsed material is dried in vacuo at room temperature in a vacuum dryer. Part of the thus pre-treated polymer sample is accurately weighed in a quantity of from about 10 mg to about 1 g, and placed in a stoppered test tube. Into the tube, 2.5 ml of an acetone containing 50 m moles iodoacetamide is added. The tube is hermetically stoppered, heated at 100° C. for 60 minutes, water-cooled and opened. The liquid phase is separated from the slurry. Using a UV spectrophotometer, the absorption at 450 nm (absorption due to $I_2$) is measured on the separated liquid phase. The concentration of the thiol end groups is calculated from the UV absorption measurement using a calibration curve which has been prepared with a standard thiol compound

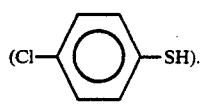

The amount of the sample used in the analysis is preferably selected so that the thiol concentration in the slurry is in the range of about 0.1–0.3 moles/l.

In the following Examples, the above analytical procedure was carried out thrice on each of the polymer samples and the average contents of the thiol end groups are reported in Table 1.

EXAMPLES 1-11

Preparation of poly(phenylene sulfide)

A 15-l capacity autoclave was charged with 17.4 moles of $Na_2S.2.9H_2O$ and 5.8 l of N-methyl-2-pyrrolidone. The mixture was heated to 200° C. under a stream of nitrogen with stirring so as to distill off 540 g of a distillate consisting mainly of water. The reaction system was cooled down to 150° C., to which 17.6 moles of p-dichlorobenzene was added. The reaction system was shieled under a stream of nitrogen and heated to 250° C. to allow the reactants to polymerize at this temperature for a period of 3 hours. On completion of the polymerization, a sample of the reaction mixture was taken for determining the content of thiolate or thiol end groups in the product polymer. The remainder of the reaction mixture was placed under vacuum to recover the N-methyl-2-pyrrolidone solvent therefrom. The crude polymer was washed with water and dried. The resulting polymer (1780 g) had a melt viscosity of 260 poises as measured by the above-defined method.

Then, parts of the above-obtained poly(phenylene sulfide) were charged respectively in a 500-ml capacity autoclave together with N-methyl-2-pyrrolidone and either $Na_2S.2.9H_2O$ or $NaSH.1.3H_2O$ in various amounts as set forth in Table 1 below. Each of the reaction mixtures was heated and reacted at the temperature for the time given in Table 1. Upon completion of the reaction, the autoclave was cooled to room temperature and the contents were poured into water so as to precipitate the treated polymer which was recovered by filtration, rinsed with pure water, treated with a dilute hydrochloric acid, rinsed with pure water for 30 minutes and finally with acetone for 30 minutes, and then dried in vacuo at room temperature in a vacuum dryer.

A sample each of the thus finished polymers was analyzed for the content of thiolate or thiol end groups.

The sample which was taken from the 15-l capacity autoclave for determining the content of thiolate or thiol end groups was also subjected to the above-described rinsing procedure prior to the thiolate/thiol determination. Similarly, in each of the following Examples, a sample or samples taken for the thiolate/thiol determination were rinsed using the same procedure.

COMPARATIVE EXAMPLE 1

The sample which was taken, from the 15-l capacity autoclave in Example 1, for determination of the thiol content was analyzed for the thiolate or thiol end groups. The results are set forth in Table 1.

As seen in the table, the polymer which is not treated with the alkali metal sulfide or hydrosulfide after the polymerization stage has a low level of thiolate or thiol content.

COMPARATIVE EXAMPLE 2

Part of the poly(phenylene sulfide) product that was prepared in the 15-l capacity autoclave in Example 1 was reacted with $NaSH.1.3H_2O$ in N-methyl-2-pyrrolidone at 100° C. for 3 hours. The results are shown in Table 1.

It can be seen that the employed reaction temperature was too low to permit the reaction to proceed quantitatively.

COMPARATIVE EXAMPLE 3

Part of the poly(phenylene sulfide) product that was prepared in the 15-l capacity autoclave in Example 1 was reacted with $Na_2S.2.9H_2O$ at 250° C. for 3 hours. The results are shown in Table 1. The poly(phenylene sulfide) material had degraded or decomposed during the reaction. It was impossible to determine the melt viscosity of the degraded polymer (less than 3 poises). Because considerable quantities of thiophenol and thioanisole were formed by the degradation and these compounds were difficultly distinguishable from the thiolate or thiol end groups of the polymer, the determination of thiolate or thiol end groups was not carried out.

served before addition of the additional sodium sulfide and after the treatment or reaction with that additional sodium sulfide were

|  | before the addition of $Na_2S$ |  | after the reaction |
| --- | --- | --- | --- |
| Conversion | 97% | → | 100% |
| Melt viscosity | 91 poises | → | 171 poises |
| Thiolate/thiol content | 20 μ moles/g | → | 48 μ moles/g |

Clearly, the addition of $Na_2S.2.9H_2O$ in the later stage of the polymerization process is effective for increasing the thiolate or thiol content in the polymer.

As above-described, the poly(phenylene sulfide) product according to the present invention contains an increased level of reactive thiol or thiolate end groups in the molecule. It is expected that the polymer product

TABLE 1

|  | PPS[1] (moles of the specified structural unit) | $Na_2S.2.9H_2O$ (moles) | $NaSH.1.3H_2O$ (moles) | NMP[2] (g) | Reaction temp. (°C.) | Reaction time (hrs.) | Melt viscosity (poises) | Content of thiolate or thiol end groups (μ moles/g) |
| --- | --- | --- | --- | --- | --- | --- | --- | --- |
| Ex. 1 | 0.45 | 0.009 | — | 150 | 180 | 3 | 648 | 42 |
| 2 | " | " | — | " | " | 5 | 544 | 43 |
| 3 | " | 0.0045 | — | " | " | " | 454 | 40 |
| 4 | " | — | 0.018 | " | " | 1 | 403 | 38 |
| 5 | " | — | " | " | " | 3 | 583 | 42 |
| 6 | " | — | " | " | " | 5 | 590 | 45 |
| 7 | " | — | " | " | " | 10 | 440 | 45 |
| 8 | " | — | " | " | 190 | 5 | 420 | 47 |
| 9 | " | — | 0.009 | " | 200 | 3 | 324 | 56 |
| 10 | " | — | " | " | 220 | " | 36 | 65 |
| 11 | " | — | " | " | 160 | 5 | 356 | 34 |
| Comp. Ex. 1 | " | — | — | — | — | — | 260 | 18 |
| 2 | " | — | 0.018 | 150 | 100 | 3 | 282 | 23 |
| 3 | " | 0.009 | — | " | 250 | " | <3 | — |

[1]Poly(phenylene sulfide)
[2]N-methyl-2-pyrrolidone

EXAMPLE 12

This Example illustrates addition of $Na_2S.2.9H_2O$ to poly(phenylene sulfide) during the later stage of the polymerization process.

To a 500-ml capacity autoclave, 0.606 moles of $Na_2S.2.9H_2O$ and 150 g of N-methyl-2-pyrrolidone were charged and heated to 200° C. in a stream of nitrogen while stirring so as to distill off 18.6 g of water and 2.4 g of N-methyl-2-pyrrolidone. Thereafter, the reaction system was cooled down to 150° C., and then 0.6 moles of p-dichlorobenzene was added together with 50 g of N-methyl-2-pyrrolidone. The system was sealed under a nitrogen atmosphere and heated to 250° C. and the polymerization was allowed to proceed at this temperature for 3 hours. Then the autoclave was cooled to room temperature. Part of the product was withdrawn from the autoclave to determine the conversion of p-dichlorobenzene, the melting viscosity of the polymer, and the thiolate or thiol content of the polymer.

To the remainder of the reaction mixture, 0.033 moles of $Na_2S.2.9H_2O$ was added and then the autoclave was hermetically sealed again under a nitrogen atmosphere and heated at 180° C. to allow the reaction to proceed for a period of 3 hours. After the reaction, the product was isolated through the above-mentioned rinsing procedure used for the thiol determining sample.

The conversions of p-dichlorobenzene, the melt viscosities of the polymers and the contents of the thiolate or thiol end groups in the polymers which were obwill spread its use in various applications taking advantage of the high reactivity.

What is claimed is:

1. A method for preparing poly(phenylene sulfide) which comprises reacting the material consisting essentially of a poly(phenylene sulfide) containing structural units:

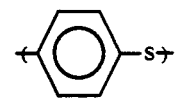

in a proportion of greater than 70 mole % and having a melt viscosity of at least 5 poises as measured at 300° C. with an alkali metal hydrosulfide in a polar aprotic solvent at a temperature in the range of from 150° C. to 230° C. so as to introduce an increased amount of thiol end groups to the poly(phenylene sulfide).

2. A method as claimed in claim 1 wherein said proportion is greater than 90 mole %.

3. A method as claimed in any one of claims 1 or 2 wherein the starting poly(phenylene sulfide) comprises one or more subsidiary structural units selected from the group consisting of

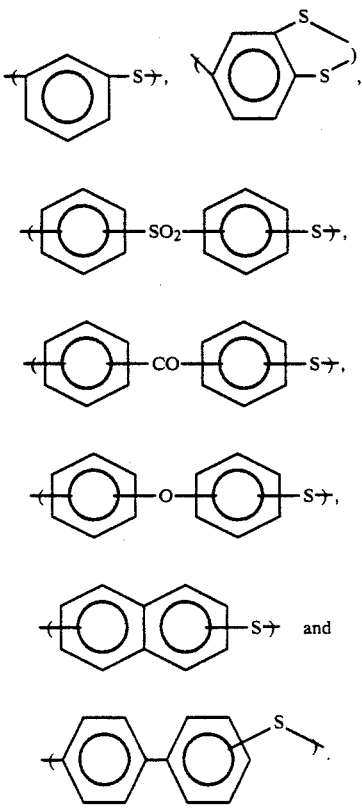

4. A method as claimed in claim 1 wherein the alkali metal hydrosulfide is selected from the group consisting of lithium, sodium, potassium, rubidium and cesium hydrosulfides and mixtures thereof.

5. A method as claimed in claim 4 wherein the alkali metal hydrosulfide is sodium hydrosulfide.

6. A method as claimed in claim 1 wherein the alkali metal hydrosulfide is employed in a concentration of 0.05–10 mole % per a structural unit of the starting poly(phenylene sulfide).

7. A method as claimed in claim 1 wherein the polar aprotic solvent is selected from the group consisting of N,N-dimethyl formamide, N,N-dimethyl acetamide, hexamethylphosphoramide, N-methyl-ε-caprolactam, N-ethyl-2-pyrrolidone, N-methyl-2-pyrrolidone, 1,3-dimethylimidazoline, dimethyl sulfoxide, sulfolane and tetramethyl urea.

8. A method for preparing a poly(phenylene sulfide) which introduces thiol end groups into said poly(phenylene sulfide), said method comprising reacting the materials consisting essentially of a paradihalobenzene with an alkali metal sulfide in a polar aprotic solvent under conventional conditions for producing a poly(phenylene sulfide) containing structural units:

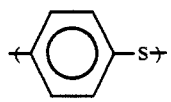

in a proportion of greater than 70 mole % and, after a conversion of the fed para-dihalobenzene of at least about 90% has been achieved or after completion of said reaction and isolation of the resulting polymer, subjecting the resulting polymer-containing mixture or isolated polymer to the treatment with the alkali metal hydrosulfide in accordance with the method as claimed in claim 1.

9. The method of claim 8 wherein the para-dihalobenzene is copolymerized with at least one member selected from the group consisting of m-dihalobenzenes, 1,2,4-benzenes, dihalodiphenyl sulfones, dihalobenzophenones, dihalodiphenyl ethers, dihalonaphthalenes, and dihalobiphenyls.

* * * * *